United States Patent [19]

Colliard

[11] 4,091,766
[45] May 30, 1978

[54] PET COLLAR

[76] Inventor: Lynette K. Colliard, 3061 Gibralter Ave., Costa Mesa, Calif. 92626

[21] Appl. No.: 492,602

[22] Filed: Jul. 29, 1974

[51] Int. Cl.² .............................................. A01K 27/00
[52] U.S. Cl. .................................. 119/106; 40/21 C; 40/586; 350/98
[58] Field of Search ............... 119/106, 156, 109; 239/34-36, 52-57, 60; 2/311; 128/133; 350/98; 40/129 A, 21 C, 304

[56] References Cited

U.S. PATENT DOCUMENTS

| | | | |
|---|---|---|---|
| 1,093,743 | 4/1914 | Tegarden | 119/106 X |
| 1,657,250 | 1/1928 | Fetters | 119/106 |
| 1,739,289 | 12/1929 | Carter | 350/98 |
| 2,219,569 | 10/1940 | Vanderhoof | 119/106 X |
| 2,680,315 | 6/1954 | McHugh et al. | 119/106 X |
| 2,798,458 | 7/1957 | Odermatt | 119/106 |
| 3,640,273 | 2/1972 | Ray | 128/133 |
| 3,800,450 | 4/1974 | Laugherty et al. | 40/21 C |

FOREIGN PATENT DOCUMENTS 730,981   6/1955   United Kingdom ................. 119/106

Primary Examiner—Jay N. Eskovitz
Attorney, Agent, or Firm—Gordon L. Peterson

[57] ABSTRACT

A pet collar includes a neck embracing member having a tubular configuration and flexible characteristics facilitating the operable disposition of the collar around the neck of an animal. A reflective strip, insertable into the tubular member, has a reflective surface which faces outwardly through a translucent sidewall of the embracing member. Light passing through the translucent sidewall of the embracing member is reflected by the reflective strip to signal the presence of the animal. An identification card can also be disposed interiorly of the tubular embracing member to provide means for identifying the animal. A strip having characteristics for absorbing liquids is adhered to the outer surface of the tubular member for operable disposition in contact with the neck of the animal. The liquid impregnating the absorbent strip can either be an insecticide for inhibiting insect infestation, or a perfume for inhibiting animal odor. The invention also includes a preferred method for constructing the pet collar.

12 Claims, 6 Drawing Figures

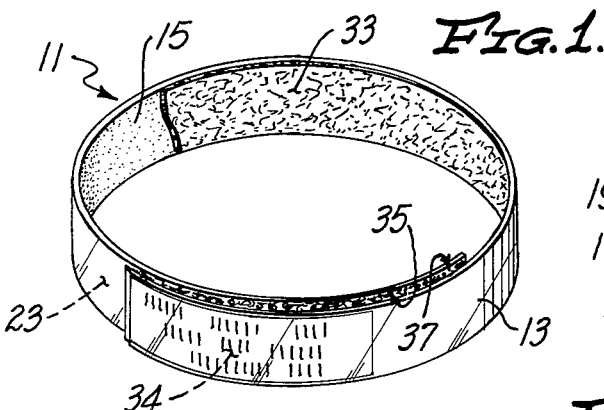
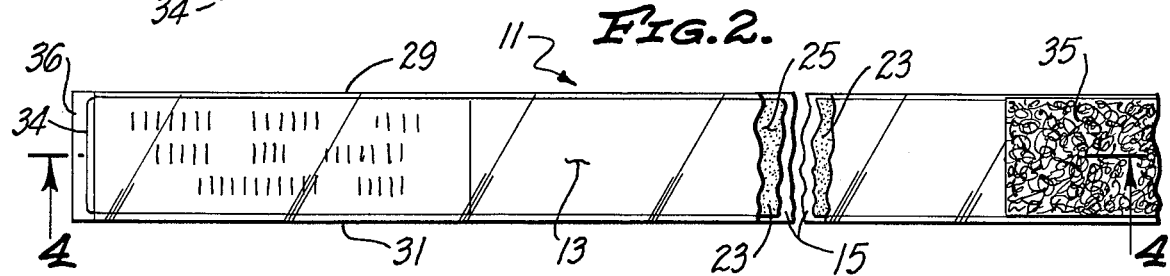
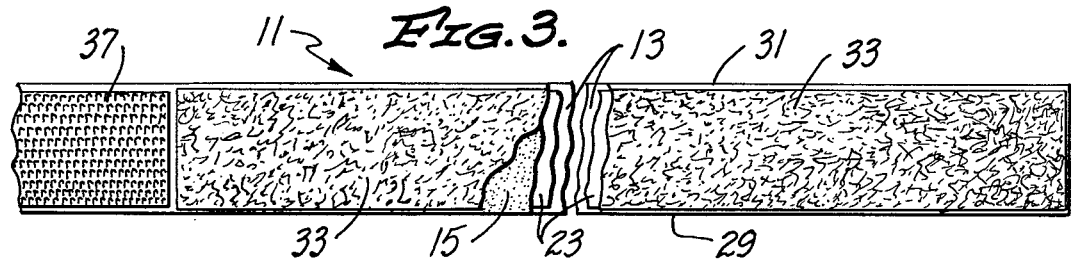
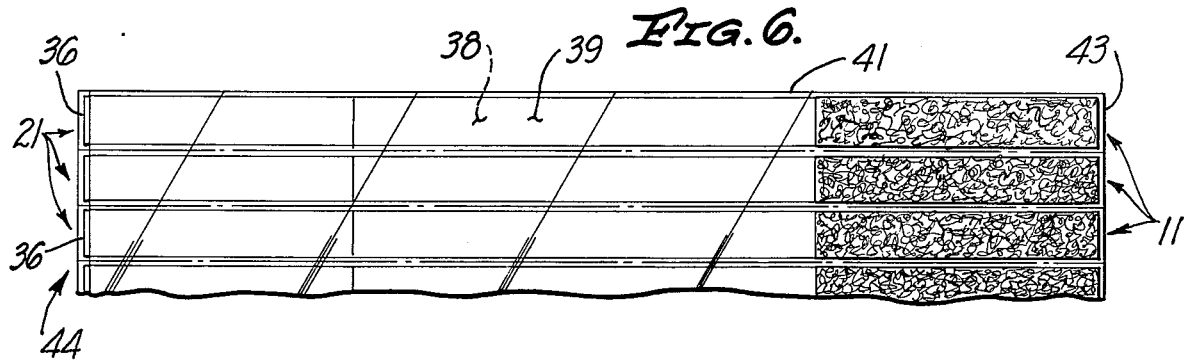

PET COLLAR

BACKGROUND OF THE INVENTION

1. Field of the Invention

This invention relates generally to animal supplies and more specifically to animal collars which facilitate the detection, identification and protection of an animal.

2. Description of the Prior Art

Collars are commonly used for the identification of domestic animals such as pets. The collars, which are typically attached around the neck of the animal, provide a means by which an animal can be tagged to indicate immunization against diseases such as rabies. The collars also provide a convenient place for attaching name tags and city licenses for identifying the animal. Leashes and other tying apparatus are also commonly attached to the animal collars to permit restriction of the animal to a particular area.

In the past, the desirability of providing the collars with luminescent characteristics has been recognized. For example, in U.S. Pat. No. 2,798,458 issued to Odermatt on July 9, 1957, a pet collar is described which is coated with luminescent paint to facilitate the location of the pet in the dark. Luminescent paint does not provide a particularly bright light even in darkness and for this reason is not a significant aid in facilitating the detection of the animal. The paint also tends to chip, wear off, and otherwise deteriorate with exposure and the rubbing action on the neck of the animal.

Various devices have also been used in conjunction with pet collars for identifying the particular animal. For example, elaborate apparatus such as that disclosed in U.S. Pat. No. 2,890,534 issued to Quayle on June 16, 1959 for a buckle, have included a plastic enclosure into which an identification card can be disposed. Such apparatus are particularly expensive to manufacture.

It is well known that animals are often plagued with insects, such as fleas and ticks, which infest their hair. To inhibit this infestation, insecticides have been produced which can be sprayed directly upon the hair of the animal. This procedure provides protection for only approximately 3 or 4 days since the insecticide is not particularly effective in penetrating to the skin of the animal. Some animal collars have been provided with an insecticide which is carried by the body heat of the animal down to the area of the skin. Although these collars are effective for a longer period of time, such as 3 months, it has been desirable to buy a new collar after this period of time in order to continue the protection.

In some pet collars of the prior art, such as the collar disclosed in U.S. Pat. No. 2,791,202 issued to Doyle on May 7, 1947, an absorbent material has been impregnated with insecticide and disposed within an elaborate tube embracing the neck of the animal. Holes extending into the tube facilitate the emission of insecticide vapors from the tube onto the animal. This apparatus has been bulky and expensive to manufacture. Furthermore, it has been desirable to provide the tube with a special seal along the length thereof to permit the insertion of the absorbent material into the collar. These collars of the prior art have failed to permit sufficient contact between the impregnated absorbent material and the animal. As a consequence, the collars have not been particularly effective in inhibiting the infestation of the animal with insects, such as fleas. It has been particularly difficult to recharge the absorbent material in these collars of the prior art.

The collars of the prior art have included means for securing the collar around the neck of the animal. These securing means include loop elements, such as those disclosed in the U.S. Pat. No. 2,798,458, and buckles, such as that disclosed in the U.S. Pat. No. 2,791,202. These particular securing means are typical of those of the prior art which require some manipulation to remove the collar from the animal. In some cases the collars, when operatively disposed on the animal, have been caught on various objects, such as water faucets, resulting in severe injury and even strangulation to the animal.

SUMMARY OF THE INVENTION

In the present invention, a pet collar is disclosed which is formed from a light transmitting material and provided with the configuration of a flattened tube. A reflective material is disposed within the tube to provide a relatively bright signal in response to light projected thereon from a source such as headlights of an automobile. The collar also includes a card which can be disposed within the tube and provided with indicia for identifying an animal. An absorbent material, which is adhered to the outer surface of the tube, can be repeatedly impregnated with an insecticide to inhibit insects infestation for an extended period of time. The collar can be secured around the neck of the animal by means permitting the release of the collar should it become caught on an object such as a water faucet.

A first strip of transparent plastic material is sealed to a second strip of plastic material along the longitudinal edges thereof to provide the collar with a flat tubular configuration. A strip of tape having a reflective surface can be disposed within the tube with the reflective surface facing the transparent strip of material. Light passing through the transparent strip is reflected by the reflective surface of the tape to provide a relatively bright light. Thus the reflective strip is particularly effective for alerting drivers as to the presence of the animal in the roadway. A card printed with identification and other types of information can also be disposed in the tube with the reflective strip.

A strip of absorbent material can be adhered to the second strip of plastic material to provide a lining on the inner surface of the collar. This absorbent material can be impregnated with an insecticide to inhibit the infestation of the animal with insects such as ticks and fleas. Due to the direct contact of the impregnated lining with the hair of the animal, the insecticide is more effective in reaching the skin of the animal. Since the lining is exposed on the surface of the collar, the absorbent material can be recharged with ease. These structural features are of equal advantage if it is desirable that the absorbent material be impregnated with another type of liquid such as a deodorant.

A material manufactured by American Robbins Co. and marketed under the trademark Velcro can be adhered to the collar to secure the collar around the neck of the animal. For example, a loop portion of the Velcro material can be adhered to the first strip at one end of the collar, and a hook portion of the Velcro can be adhered to the second strip at the opposite end of the collar. When the collar is operably disposed around the neck of the animal, the hook portion and the loop portion can be engaged to provide the collar with a variable length. This means for securing the collar is releasable in response to a shearing force such as that which would result if the collar were caught on an object such as a water faucet.

In a preferred method for manufacturing the collar, multiple tubes are constructed by heat sealing a pair of vinyl sheets along several substantially parallel lines. The cavity formed between adjacent lines provides the tube associated with one of the collars. A strip of reflective material is inserted into each of the tubes along with an identification card. This insertion is facilitated by providing a tab for holding the collar at the open end of the tube. A sheet of velour felt can be ironed onto the outer surface of one of the vinyl sheets. Than, the hook portion and loop portion of the Velcro material can be adhered to the opposite sides of the tube at opposite ends of the tube to provide means for securing the collar around the neck of the animal. Finally, the vinyl sheets can be cut along the heat seals to provide the individual collars.

These and other features and advantages of the present invention will become more apparent with a description of preferred embodiments discussed with reference to the associated drawings.

DESCRIPTION OF THE DRAWINGS

FIG. 1 is a perspective view of a pet collar having the configuration of a tube with a reflective strip and identification tag disposed within the tube and a lining disposed on the tube;

FIG. 2 is a top plan view of the pet collar illustrated in FIG. 1;

FIG. 3 is a bottom plan view of the pet collar illustrated in FIG. 1;

FIG. 4 is a cross-sectional view of the pet collar taken on line 4—4 of FIG. 2;

FIG. 5 is a cross-sectional view of the pet collar taken on line 5—5 of FIG. 4; and FIG. 6 is a plan view of several of the pet collars illustrating a preferred method for making the pet collars.

DESCRIPTION OF PREFERRED EMBODIMENTS

A pet collar is illustrated in FIGS. 1 to 5 and designated generally by the reference number 11. In a preferred construction of the collar 11, a first strip 13, having a longitudinal configuration and generally transparent properties, is joined to a second strip 15 also having a longitudinal configuration. The strips 13 and 15 are at least partially defined by coextensive longitudinal edges 17 and 19, respectively (best illustrated in FIG. 5), which are joined to define a flattened tube or sheath designated generally by the reference numeral 21.

A strip of reflective material 23 is disposed between the first strip 13 and the second strip 15 within the tube 21. The strip of reflective material 23 has a reflective surface 25 which is preferably oriented to face the first strip 13.

In a preferred embodiment, the first strip 13 is formed from a flexible material and has characteristics for passing light therethrough. For example, the material can be a polyvinyl plastic which is at least translucent and preferably transparent so that light falling upon the first strip 13 is substantially uninhibited from passing therethrough. Thus light falling on the first strip 13 of the collar 11 strikes the reflective surface 25 of the strip of reflecting material 23 and is reflected back through the first strip 13 to provide a relatively bright light. This bright light, which signifies the presence of the animal, can be particularly appreciated by a person driving an automobile during the nighttime. Thus, the lights of the automobile can be reflected by the collar 11 to signal the presence of the animal in the roadway.

In a preferred method of constructing the collar 11, described in greater detail below, the strip of reflective material 23 is inserted into the tube 21. This insertion is facilitated in an embodiment wherein the second strip 15 is formed from a material having a surface 27 with a relatively low coefficient of friction. In such an embodiment, the second strip 15 may also be formed from a flexible polyvinyl material. Although this polyvinyl material may also have characteristics for passing light, this property is not necessary to the function of the second strip 15 in the collar 11. If the first strip 13 and second strip 15 are both formed from polyvinyl materials, their edges 17 and 19 can be joined under heat and pressure to form a pair of heat seals 29 and 31 along the longitudinal edges of the tube 21.

The tubular configuration of the collar 11 is further desirable since it facilitates the disposition of an identification card 34 within the tube 21. This card 34 can be easily removed from the tube 21 to permit identification information to be printed on the card 34. Then the card 34 can be reinserted into the tube 21 where it is protected from the elements by the first and second strips 13 and 15. To facilitate the insertion of both the reflective material 23 and the card 34 into the tube 21, the second strip 15 can be made longer than the first strip 13 so that a tab 36 (best illustrated in FIG. 2) is formed at one end of the tube 21.

The reflective material 23 can be a strip of reflective tape such as that manufactured by the Minnesota Mining and Manufacturing Company. This reflective material may be provided with an adhesive backing which is protected by a release paper. If this is the case, it is desirable that the release paper be left in contact with the material 23 as it is inserted into the tube 21.

An absorbent material 33 can be adhered to the outer surface of the second strip 15 to provide a lining for the collar 11. The absorbent material 33 has properties for absorbing liquids and therefore can be readily impregnated with an insecticide or deodorant.

In a preferred embodiment, this absorptive material 33 is a velour felt of the type manufactured by Arno Tape Co. and marketed under the trademark Moleskin. This material can be purchased with an adhesive backing to facilitate application of the material 33 to the second strip 15. Velour felt is particularly desirable for use as the material 33 since it is particularly absorbent of liquids such as flea and tick insecticides. Furthermore, velour felt can be placed in direct contact with the neck of the animal without becoming entangled in the hair of the animal.

It is particularly desirable that the absorptive material 33 be disposed outside the tube 21 to facilitate direct contact of the insecticide with the neck of the animal. This disposition also facilitates the changing or application of an insecticide to the absorptive material 33 when the collar 11 is removed from the neck of the animal. Then, the insecticide can be repeatedly and easily applied to the absorptive material 33 so that the collar 11 can inhibit the infestation of insects over an extended period of time. It is apparent that the absorptive material 33 can be impregnated with other liquids, such as deodorants, to perform a different or changed function.

As is the case with most pet collars, it is desirable to provide some means for securing the collar in an operable position around the neck of the animal. It is further desirable that the securing means have properties for providing the collar with a variable length so that it fits animals having different neck sizes. It may also be desirable that the securing means have properties for releasing the collar if it should become caught on an object, such as a faucet. In the past, animals have been severely injured and even strangled when their collars have become caught in this manner.

In a preferred embodiment of collar 11, means for securing the collar is provided by a material manufactured by the American Robbins Company and marketed under the trademark Velcro. This material is provided in two portions, a loop portion 35 and a hook portion 37 both of which can be purchased with an adhesive backing. It is desirable that the loop portion 35 and the hook portion 37 be disposed at opposite ends of the tube 21 with one of the portions 35 and 37 facing outwardly of the first strip and the other of the portions 35 and 37 facing outwardly of the second strip. This will facilitate operable disposition of the collar 11 around the neck of the animal in the ring configuration illustrated in FIG. 1. In the embodiment illustrated in FIGS. 3 and 4, the loop portion 35 is adhered to the first strip 13 at one end of the tube 21 and the hook portion 37 is adhered to the second strip 15 at the other end of the tube.

In a preferred method for making the collar 11, a sheet 38 of material similar to that forming the second strip 15 is placed in juxtaposition to a sheet 39 of material similar to that of the first strip 13. These sheets 38 and 39 preferably have a rectangular configuration and are heat sealed along all but one of their edges. In the embodiment illustrated in FIG. 6, the heat sealed edges include those designated by the reference numerals 41 and 43. A plurality of heat seals 45 can be formed substantially parallel to the edge 41 and spaced a distance approximately equal to the desired width of the collar 11. Thus the sheets 38 and 39 define a plurality of the tubes 21 between each of an ajacent pair of the heat seals 45. In the embodiment illustrated in FIG. 6, the sheet 38 extends beyond the sheet 39 at an unsealed edge designated by the reference numeral 44. This extension of the sheet 38 forms the tabs 36, one of which located in proximity to an opening into each of the tubes 21.

With this configuration, the tubes 21 can be loaded with the strips of reflective material 23 and the identification cards 34. This can be accomplished most easily by holding the respective tab in one hand while sliding the strips 23 and cards 34 through the associated openings near the tabs 36 with the other hand.

A sheet of velour felt (not shown), such as that ultimately providing the absorption material 33, can then be adhered to outer surface of the sheet 38. This adhesion can be enhanced by roughening the outer surface of the sheet 38 prior to application of the sheet of velour felt. The loop portions 35 and hook portions 37 of the Velcro material can then be adhered to the sheets 38 and 39 between the heat seals 45 and in proximity to the respective edges 44 and 43. With the adhesion of these Velcro portions 35 and 37, the filled tubes 21 can be cut along the heat seals 45 to form the individual collars 11.

In the foregoing manner, a pet collar can be provided which is particularly advantageous for use with domestic animals such as pets. In response to light projected upon the collar, a particularly bright reflective light is given off which can alert a person to the presence of the animal. This not only facilitates the location of a lost animal, but also alerts drivers to the presence of the animal in the roadway.

With the simplest of construction, the collar 11 is also adapted to receive an identification card 34. Also, with the provision of the absorptive material 33, the collar 11 can be repeatedly charged with an insecticide to inhibit infestation of the animal with insects. The accessibility of the absorptive material 33 facilitates the recharging of the collar 11 with the insecticide to provide protection for an extended period of time. The absorptive material 33 can also be impregnated with other fluids, such as deodorants.

The use of the Velcro to provide a means for securing the collar around the neck of the animal is particularly desirable. The Velcro is not only capable of providing the collar 11 with a variable length, but also permits the collar 11 to be released should it become caught on an object such as a water faucet.

Although the invention has been described with reference to specific embodiments, it will be apparent that it can be otherwise embodied so that the scope of the invention should be ascertained only with reference to the following claims.

I claim:

1. A collar for attachment to the neck of an animal comprising:
   an elongated sheath adapted to embrace the neck of the animal, said sheath having first and second sides, at least a portion of said first side being capable of passing light, said sheath having longitudinally spaced regions;
   means for releasably connecting the spaced regions of the sheath to permit the sheath to be formed into a loop with the first side facing outwardly and the second side facing inwardly whereby the sheath can be releasably affixed to the neck of the animal;
   reflective means for reflecting light, said reflective means being within said sheath and protected by said sheath, said reflective means facing said first side whereby light passing through said first side is reflected through said first side to thereby signal the presence of the animal;
   absorbent material; and
   means for mounting the absorbent material on said second side of said sheath with the absorbent material being on the exterior of said sheath.

2. A collar as defined in claim 1 wherein said reflective means includes a reflective strip within said sheath.

3. A collar as defined in claim 1 wherein said sheath includes first and second strips of plastic material at least partially defining the first and second sides, respectively, said first and second strips being heat sealed together along their longitudinal edges.

4. The collar as set forth in claim 1 wherein the connecting means includes a loop portion attached to the sheath at one of said spaced regions and including a plurality of loops and a hook portion attached to the other of said spaced regions and having a plurality of hooks, the hooks of the hook portion having characteristics for engaging the loops of the loop portion to releasably secure the sheath around the neck of the animal.

5. A collar as defined in claim 1 wherein at least one end of said sheath is open and adapted to receive identification material.

6. A collar as defined in claim 1 wherein said reflective means includes a reflective strip within said sheath, said sheath includes first and second strips of plastic material at least partially defining the first and second sides, respectively, said first and second strips being heat sealed together along their longitudinal edges, at least one end of said sheath being open and adapted to receive identification material, a loop portion attached to the sheath at one of said spaced regions, a hook portion attached to said sheath at the other of said spaced regions, and said loop portion and said hook portion being adapted to releasably secure the sheath around the neck of the animal.

7. A collar as defined in claim 1 wherein said first and second sides of said sheath completely circumscribe the reflective means and define an interior passage, said reflective means being in said interior passage.

8. A collar as defined in claim 7 wherein one end of said sheath is open to provide access to said interior passage and said collar includes an identification device in said interior passage adjacent said open end.

9. A collar as defined in claim 8 including a tab on the sheath adjacent said open end to facilitate the manual insertion of the identification device through said open end and into the interior passage.

10. A collar as defined in claim 7 wherein said reflective means is free from attachment to the sheath.

11. A collar for attachment to the neck of an animal comprising:

an elongated flattened tube having an interior passage and adapted to embrace the neck of the animal, said tube having first and second sides, at least a portion of said first side being capable of passing light, said tube having longitudinally spaced regions;

means for releasably connecting the spaced regions of the tube to permit the sheath to be formed into a loop with the first side facing outwardly and the second side facing inwardly whereby the tube can be releasably affixed to the neck of the animal;

an elongated reflective strip having a reflective surface for reflecting light, said reflective strip being in said interior passage and protected by said tube, said reflective surface facing said first side whereby light passing through said first side is reflected through said first side to thereby signal the presence of the animal, said sides of said tube completely circumscribing said reflective strip; and an elongated strip of absorbent material adhesively attached to said second side of said tube on the exterior of said tube.

12. A collar as defined in claim 11 wherein one portion of said tube is open, said collar includes an identification device adapted to receive identifying indicia, said identification device being within said passage adjacent said one portion.

* * * * *